(12) United States Patent
Kawakatsu (10) Patent No.: US 8,576,590 B2
(45) Date of Patent: Nov. 5, 2013

(54) POWER SUPPLY AND IMAGE FORMING APPARATUS

(75) Inventor: Jun Kawakatsu, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 251 days.

(21) Appl. No.: 12/970,277

(22) Filed: Dec. 16, 2010

(65) Prior Publication Data

US 2011/0150523 A1 Jun. 23, 2011

(30) Foreign Application Priority Data

Dec. 21, 2009 (JP) ................................. 2009-288822

(51) Int. Cl.
*G03G 15/00* (2006.01)
(52) U.S. Cl.
USPC ............................................. 363/63; 399/88
(58) Field of Classification Search
USPC .......................................................... 399/88
See application file for complete search history.

(56) References Cited

U.S. PATENT DOCUMENTS 5,682,575 A * 10/1997 Komori ........................... 399/66
7,460,924 B2 * 12/2008 Alexander et al. ............ 700/123
7,768,801 B2 * 8/2010 Usui et al. ................... 363/21.06

FOREIGN PATENT DOCUMENTS

JP 5-300740 A 11/1993
JP 6-318117 A 11/1994
JP 2001-249554 A 9/2001

* cited by examiner

*Primary Examiner* — David Gray
*Assistant Examiner* — Michael Harrison
(74) *Attorney, Agent, or Firm* — Canon U.S.A., Inc., IP Division (57) ABSTRACT

A power supply includes a transformer, a switching unit configured to drive the transformer at a primary side of the transformer, a voltage adjustment unit configured to adjust voltage of a capacitive element at a secondary side of the transformer, at the primary side thereof, and a plurality of constant voltage members connected across the terminals of the capacitive element at the secondary side of the transformer, wherein the power supply generates voltage having a predetermined polarity during the period before the voltage of the capacitive element at the secondary side of the transformer becomes a predetermined voltage by the voltage adjustment unit, and generates voltage having a polarity opposite to the predetermined polarity after the voltage of the capacitive element at the secondary side becomes the predetermined voltage.

14 Claims, 8 Drawing Sheets

POWER SUPPLY AND IMAGE FORMING APPARATUS

BACKGROUND OF THE INVENTION

1. Field of the Invention

The present invention relates to a power supply capable of responding to a variation in load, and an image forming apparatus provided with the power supply.

2. Description of the Related Art

Figure 8:
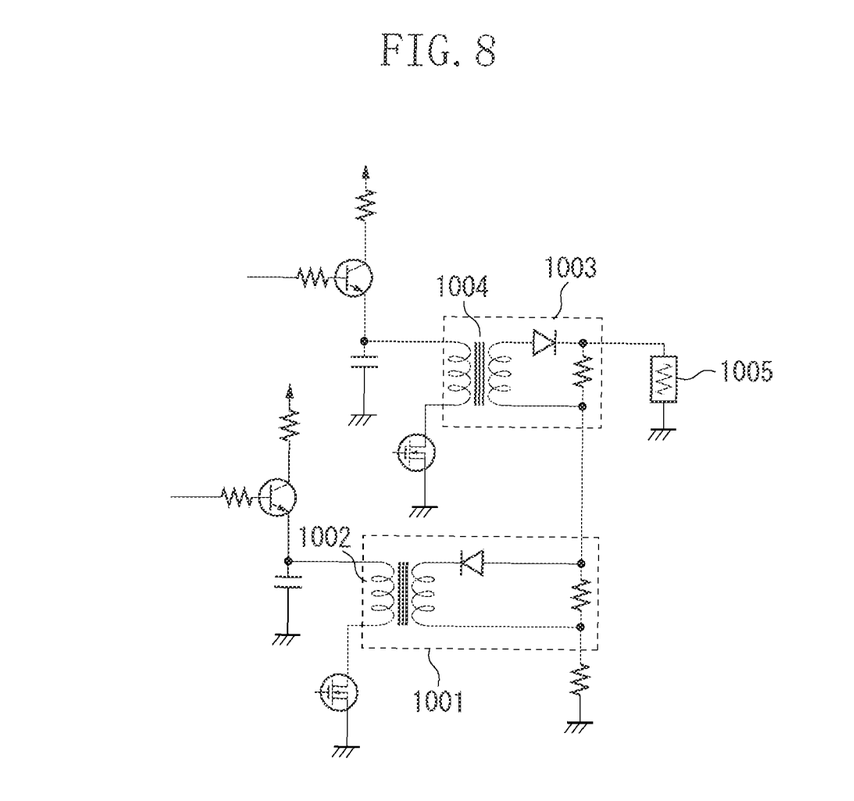
FIG. 8 is a diagram illustrating a voltage generation circuit of a conventional power supply.

There has conventionally been known a power supply, as a configuration for applying bipolar voltage (hereinafter sometimes referred to as bias) which has a positive polarity and a negative polarity, in which a power supply for outputting a positive polarity and a power supply for outputting a negative polarity are connected in series to selectively output voltage having a positive polarity or voltage having a negative polarity. One example of a configuration of a conventional power supply for outputting voltage having a positive polarity and a negative polarity will briefly be described with reference to FIG. 8. As illustrated in FIG. 8, a negative bias generation circuit 1001 and a positive bias generation circuit 1003 are connected in series, and each output terminal is connected to a load 1005. When a transformer 1002 is driven in this configuration (a transformer 1004 is not driven), a negative bias is applied to the load, and when the transformer 1004 is driven (the transformer 1002 is not driven), a positive bias is applied to the load. The configuration of the power supply described above is discussed in Japanese Patent Application Laid-Open No. 6-318117.

However, in the configuration of the conventional power supply, the biases of both polarities are selectively obtained from the positive bias generation circuit and the negative bias generation circuit, each of which are connected with the load, thereby the circuit size becomes large. More specifically, this configuration prevents a power supply circuit from reducing its size, which prevents reduction of a size of a substrate or an apparatus. Further, this configuration needs to have another control signal for changing the positive bias and the negative bias in addition to a control signal for controlling a value of a target voltage output from the power supply. When there are a plurality of loads that need the positive and negative biases, the number of the control signal might be increased.

SUMMARY OF THE INVENTION

The present invention is directed to a power supply that can reduce a circuit size and can easily switch a polarity of an output voltage.

According to an aspect of the present invention, a power supply includes a transformer, a switching unit configured to drive the transformer at a primary side of the transformer, a voltage adjustment unit configured to adjust voltage of a capacitive element at a secondary side of the transformer, and a plurality of constant voltage members connected the capacitive element at the secondary side of the transformer, wherein the power supply generates voltage having a predetermined polarity during the period before the voltage of the capacitive element at the secondary side of the transformer becomes a predetermined voltage by the voltage adjustment unit, and generates voltage having a polarity opposite to the predetermined polarity after the voltage of the capacitive element at the secondary side becomes the predetermined voltage.

Further features and aspects of the present invention will become apparent from the following detailed description of various exemplary embodiments with reference to the attached drawings.

BRIEF DESCRIPTION OF THE DRAWINGS

The accompanying drawings, which are incorporated in and constitute a part of the specification, illustrate various exemplary embodiments, features, and aspects of the invention and, together with the description, serve to explain the invention.

DESCRIPTION OF THE EMBODIMENTS

Various exemplary embodiments, features, and aspects of the invention will be described in detail below with reference to the drawings.

Figure 7:
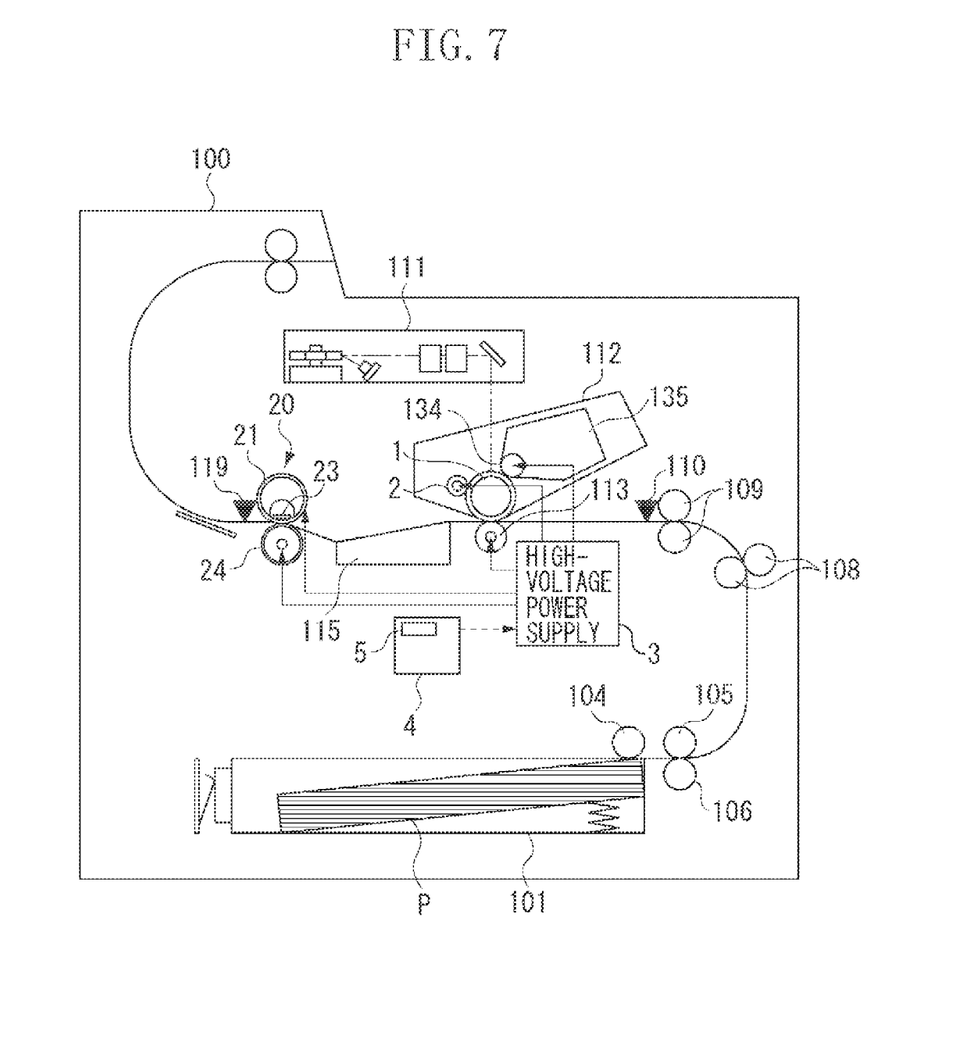
FIG. 7 is a diagram illustrating an overall configuration of an image forming apparatus.

FIG. 7 illustrates a schematic configuration of an image forming apparatus and a power supply according to the present exemplary embodiment. In the first exemplary embodiment, a laser printer 100 for forming an image onto a sheet serving as a recording medium by an electro photographic system is employed as an image forming apparatus. As illustrated in FIG. 7, the laser printer 100 includes a deck 101 as a sheet stacking unit that accommodates a sheet P. The laser printer 100 is provided with a pick-up roller 104 that feeds and sends the sheet P from the deck 101. A feed roller 105 that conveys the sheet P fed by the pick-up roller 104 and a retard roller 106 that is opposite to the feed roller 105 for separating the sheet P are provided at the downstream side from the pick-up roller 104 in the conveying direction of the sheet P. A pair of conveying rollers 108 for conveying the sheet P is also provided at the downstream side in the conveying direction. A pair of registration rollers 109 that conveys the sheet P in synchronism with the timing of an image forming operation and a sensor 110 that detects the conveyance state of the sheet P, to the pair of registration rollers 109 are provided at the downstream side from the pair of conveying rollers 108 in the conveying direction of the sheet P. A process cartridge 112 that supplies developer to an electrostatic latent image formed on a photosensitive drum 1 based on a laser beam from a below-described laser scanner unit 111, to make the electrostatic latent image visible as a developer image is provided at the downstream side of the pair of registration rollers 109.

In the present exemplary embodiment, the process cartridge 112 includes a part of an image forming unit of the image forming apparatus. Specifically, it includes the photosensitive drum 1 serving as an image carrier functioning as the image forming unit, a charging roller 2 that uniformly charges the surface of the photosensitive drum 1 as a charging member, a developing container 135 that accommodates developer, and a developing roller 134 that supplies the developer to the electrostatic latent image on the photosensitive drum 1 to make the latent image visible as the developer image. The process cartridge 112 is configured to be detachably attached. The process cartridge 112 is exchanged for a new one when the developer runs out.

A transfer roller 113 that serves as a transfer member for transferring the developer image formed onto the photosensitive drum 1 to the sheet P is provided at the position opposite to the photosensitive drum 1. The photosensitive drum 1 and the transfer roller 113 form a transfer nip portion for nipping the sheet P. A conveying guide 115 is provided at the downstream side from the transfer nip portion in the conveying direction of the sheet P. A fixing apparatus 20 for fixing the developer image, transferred onto the sheet P, to the sheet P is provided at the downstream side from the conveying guide 115 in the conveying direction of the sheet P. The fixing apparatus 20 includes a fixing film 21 that serves as a heating member and includes a heater 23 therein and a pressure roller 24 provided opposite to the fixing film 21 serving as a pressure member, to apply heat and pressure to the developer image transferred onto the sheet P to fix the same.

The laser beam printer 100 in the present exemplary embodiment is provided with a power supply 3 for outputting high voltage (hereinafter referred to as high-voltage power supply 3) that generates high voltage and applies the high voltage (hereinafter sometimes referred to as a bias) to the charging roller 2, the developing roller 134, the transfer roller 113, and the fixing film 21. Further, the laser beam printer 100 has a printer control unit 4 including a central processing unit (CPU) 5 that controls the image forming operation of the laser beam printer 100. The output operation of the high voltage from the high-voltage power supply 3 is controlled by a control signal from the printer control unit 4.

When the developer image is transferred onto the sheet P, the leading edge of the sheet P, which is conveyed to the transfer nit portion, is detected by the sensor 110, and the timing of forming the electrostatic latent image onto the photosensitive drum 1 is controlled according to the detected timing. More specifically, the pair of registration rollers 109 is temporarily stopped to be at the right timing when the developer image on the photosensitive drum 1 is transferred onto a predetermined position of the sheet P.

In the configuration of the present exemplary embodiment described below, the configuration in which the bias is applied to the transfer roller 113 will be described as one example. However, the target component to which the bias is applied is not limited to the transfer roller 113. The bias is applicable to any components so long as they may use biases of both the positive polarity and negative polarity.

Figure 1:
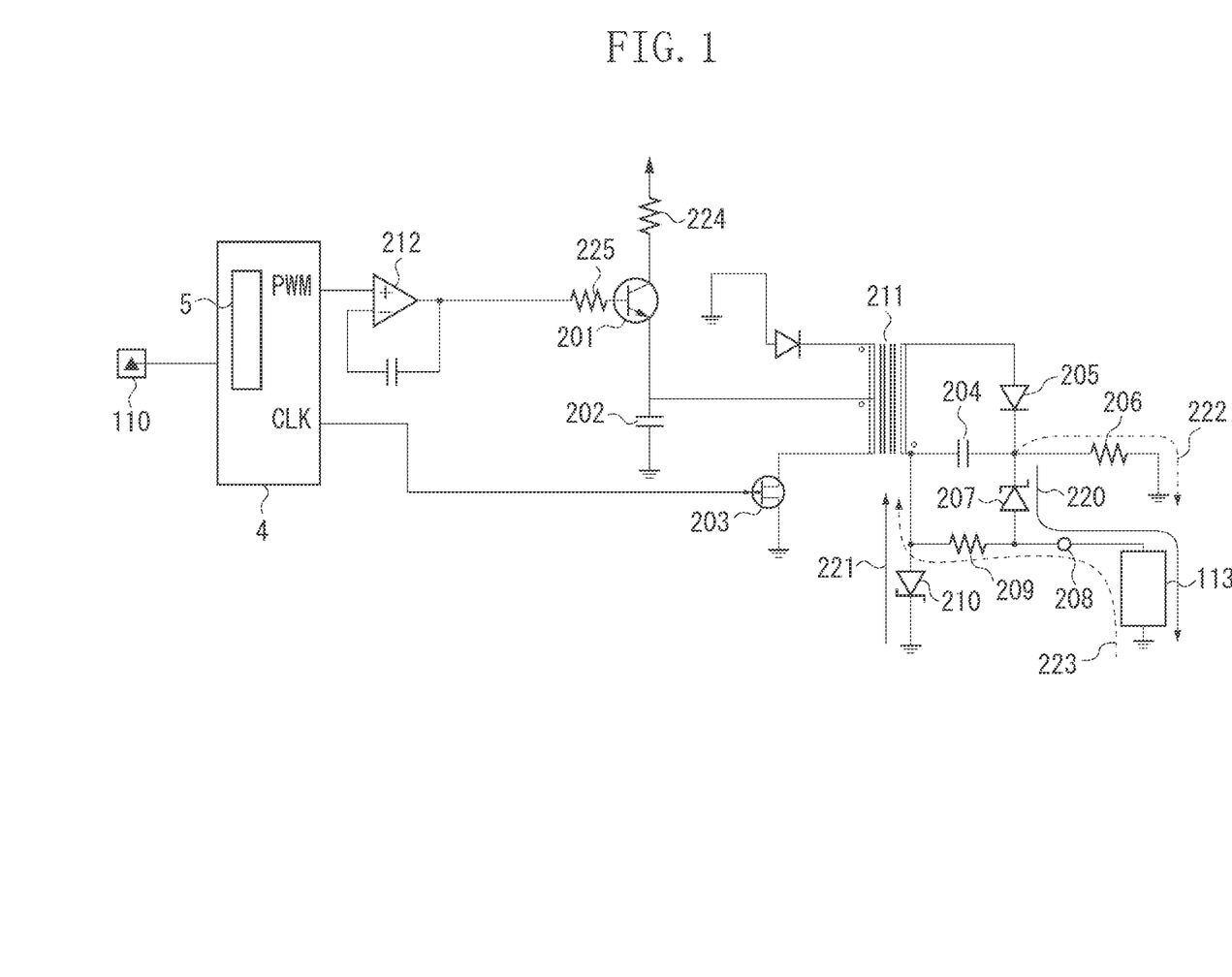
FIG. 1 is a diagram illustrating a voltage generation circuit of a power supply according to a first exemplary embodiment.
Figure 2:
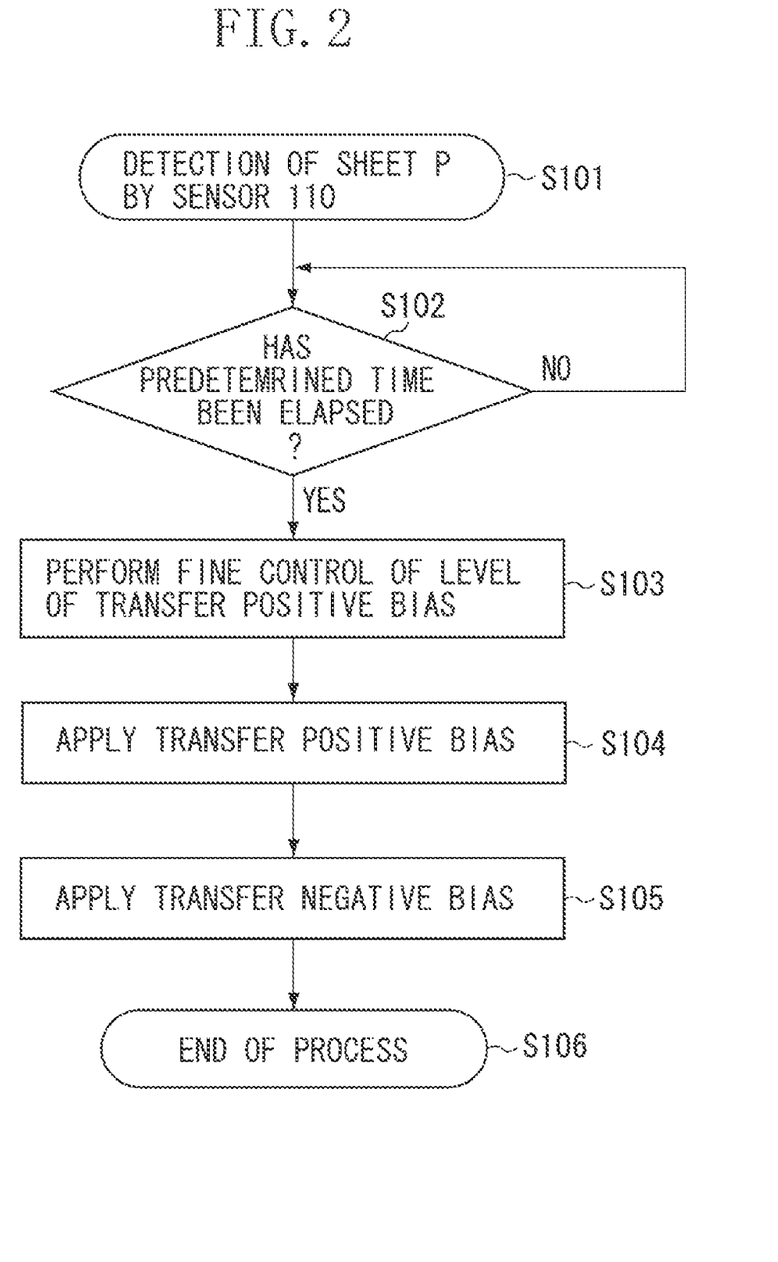
FIG. 2 is a flowchart illustrating a voltage applying sequence by the voltage generation circuit according to the first exemplary embodiment.
Figure 3:
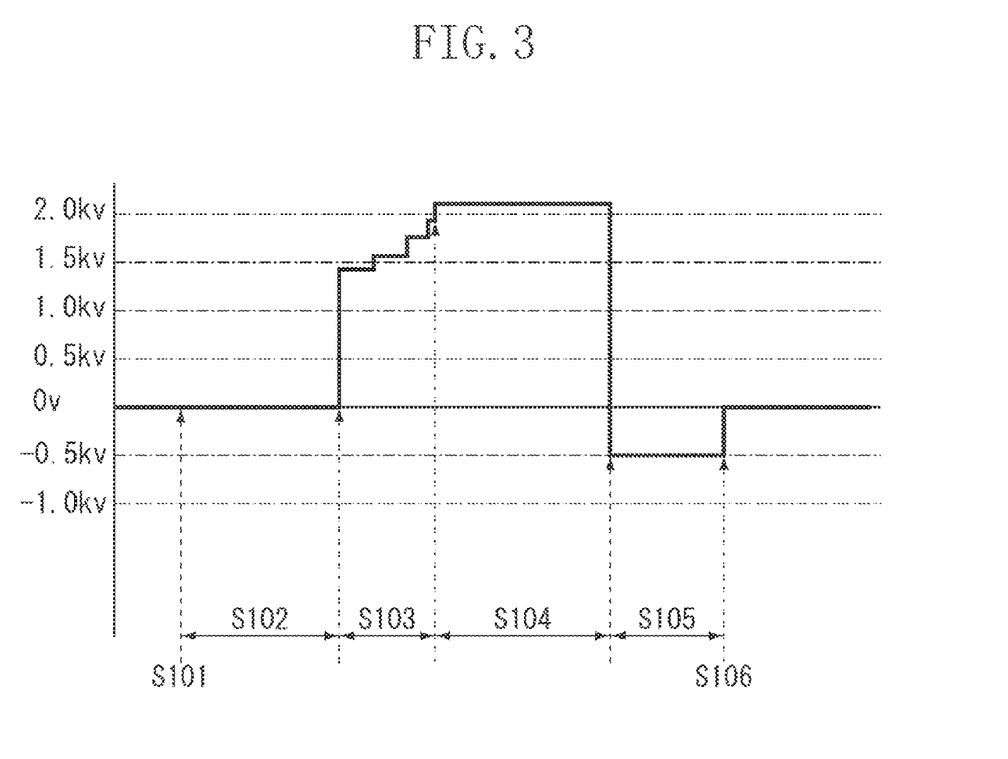
FIG. 3 is a diagram illustrating a timing of the application of voltage by the voltage generation circuit according to the first exemplary embodiment.
Figure 4:
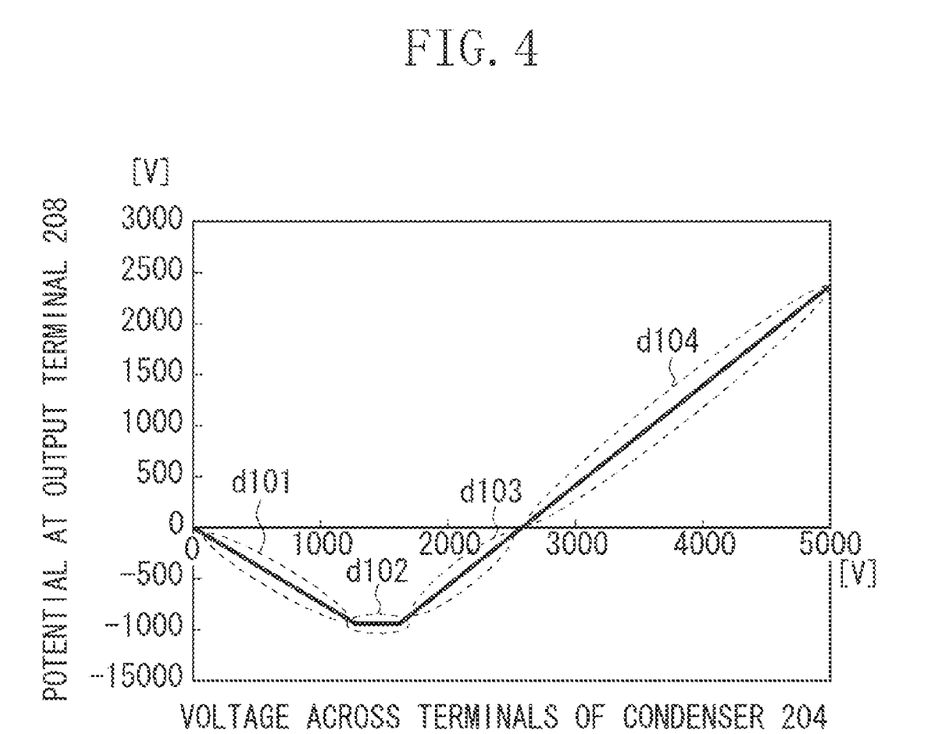
FIG. 4 is a diagram illustrating a change in voltage between the terminals of a condenser (capacitive element) and a potential at an output terminal according to the first exemplary embodiment.

The configuration of the high-voltage power supply according to the present exemplary embodiment will be described with reference to FIGS. 1, 2, and 3. FIG. 1 illustrates a high-voltage generation circuit of the high-voltage power supply 3, serving as a bias applying unit, in the present exemplary embodiment. In the present exemplary embodiment, the transfer roller 113 as a transfer member is described as an example of a target to which the high voltage is applied. A bias having a positive polarity and a bias having a negative polarity are used as the bias applied to the transfer roller 113. FIG. 2 is a flowchart illustrating a transfer bias applying sequence, and FIG. 3 is a diagram illustrating a bias level (voltage value) of the application of the transfer bias at each step in FIG. 2. FIG. 4 is a diagram illustrating a relationship of the voltage when the voltage generation circuit in FIG. 1 is operated. Specifically, FIG. 4 illustrates the relationship between the voltage applied across terminals of a condenser (capacitive element) 204 and a potential of an output terminal 208 (voltage applied to the load) in the circuit in FIG. 1.

In the description below, the bias output having the positive polarity applied to the transfer roller 113 is referred to as a transfer positive bias, and the bias output having the negative polarity is referred to as a transfer negative bias. During the period when the sheet P passes through the transfer nip portion formed by the photosensitive drum 1 and the transfer roller 113, the transfer positive bias is applied to the transfer roller 113. Thus, the developer image is transferred onto the sheet P. The impedance value (resistance value) of the transfer roller 113 changes depending on the environmental change (temperature or humidity), therefore the wide output range is required of the transfer positive bias. Specifically, the transfer positive bias has to be variably controlled according to the environmental change. If the output characteristic of the transfer positive bias is linear, the control is facilitated.

In the description of the present exemplary embodiment, a negatively charged toner serving as the developer is used. However, a positively charged toner can also be used. In this case, the transfer negative bias is applied to the sheet P to transfer the developer image, and the negative transfer bias may be variably controlled. As described below, the transfer positive bias may be applied during the period from when the sheet P passes through the transfer nip portion to when the next sheet P reaches the transfer nip portion. As described above, the transfer bias may appropriately be set to have a predetermined polarity according to the charged polarity of the toner in the apparatus to which the invention is applied.

The timing of applying the bias to the transfer roller during the image forming operation, described previously, will be described in detail with reference to FIGS. 2 and 3. Steps S101 to S106 in FIG. 2 correspond to the respective timings in S101 to S106 in FIG. 3. The process of applying the bias to the transfer roller is started when the sensor 110 detects the sheet P. When the sensor 110 detects the passage of the leading edge of the sheet P in step S101, the CPU 5 in the printer control unit 4 determines whether a predetermined time according to the conveyance speed of the sheet P has elapsed in step S102. After the lapse of the predetermined time, the CPU 5 applies the transfer positive bias, and performs a fine adjustment of the output value of the transfer positive bias during the period until the sheet P reaches the transfer nip portion from the sensor 110 in step S103. Then, in step S104, the CPU 5 outputs the transfer positive bias, which has already been finely adjusted, during the period when the sheet P is present at the transfer nip portion. As described above, the transfer positive bias is applied, and the voltage is applied in the direction in which the developer image (toner image) on the photosensitive drum 1 is attracted to the transfer roller 113, and the developer image is transferred onto the sheet P present at the transfer nip portion. Next, in step S105, the transfer negative bias is applied during the period from when the sheet P passes the nip transfer portion until when the next sheet P reaches the transfer nip portion. The transfer negative bias is applied because the toner is deposited on the transfer roller 113 in a small amount, which is to be removed (cleaned) to prevent the toner deposited on the transfer roller from being deposited onto the back surface of the next sheet, by the applying the voltage to draw back the toner onto the photosensitive drum 1. The bias to the transfer roller 113 described in the present exemplary embodiment is such that the transfer positive bias is about 2 KV, and the transfer negative bias is about −500 V as one example. However, the value of the bias is adjusted according to the environmental variation of the apparatus.

Next, the operation of the voltage generation circuit and the voltage applied to the load (transfer roller 113) during the operation will be described with reference to FIGS. 1 and 4. As one example, resistors 206 and 209 having values described below and constant voltage diodes 207 and 210 serving as one example of a constant voltage element and having breakdown voltage described below are used in the circuit. The resistance values and constants individually illustrated may be selected according to the load to which the voltage is to be applied, and when the target load is changed, the resistance values and the constants may be changed properly.

Below is one example of resistance value and breakdown voltage.
Resistance value of resistor 206: 80 MΩ
Resistance value of resistor 209: 40 MΩ
Breakdown voltage of constant voltage diode 207: 1 kV
Breakdown voltage of constant voltage diode 209: 1.6 kV In FIG. 1, a clock signal from the CPU 5 of the printer control unit 4 is input to a switching element 203 (hereinafter referred to as field-effect transistor (FET) 203) at the primary side of the transformer (electromagnetic transformer). When switching of the FET 203 according to the clock signal drives the transformer 211, the current output from the secondary side of the transformer 211 is rectified by a rectifier diode 205, and voltage is supplied across the terminals of the condenser 204 connected to an output portion of the transformer 211 at the secondary side. The voltage (hereinafter referred to as Vc) applied across the terminals of the condenser 204 depends on the voltage applied across the terminals of the condenser 202 at the primary side of the transformer 211. The voltage applied to the condenser 202 is adjusted by a signal indicating a pulse-width modulation (PWM) value from the CPU 5. The output voltage from a secondary side of a second transformer (not illustrated) is fed back to the CPU 5. Using the fed-back output voltage from the second transformer as a target voltage, the CPU 5 adjusts the signal indicating the PWM value. The signal indicating the PWM value is fed from the CPU 5 through an integration circuit 212, serving as an integrating amplifier, and a resistor 225 to a base terminal of a transistor 201. Responsive to the signal value on its base, the transistor 201 adjusts the voltage of the condenser 202. Specifically, the signal indicating the PWM value from the CPU 5, the integration circuit 212, and the transistor 201 function as a voltage adjustment unit at the primary side of the transformer 211. A collector terminal of the transistor 201 is connected to a power supply voltage through a resistor 224, and an emitter terminal is connected to the condenser 202. In the present exemplary embodiment, two constant voltage diodes 207 and 210 are turned OFF until the Vc is increased from 0 V to about 1600 V. Since the constant voltage diodes 207 and 210 are turned OFF, a main current loop (flow of current) to the load (transfer roller) 113 becomes the loop from the resistor 206, therefrom to the load 113, therefrom to the terminal 208, therefrom to the resistor 209, and therefrom back to the resistor 206, as indicated by arrows 222 and 223, and the divided voltage provided by the resistance is applied to the load 113. This condition corresponds to the range indicated by d101 in FIG. 4 that illustrates the relationship between the voltage across the terminals of the condenser 204 and the potential at the output terminal 208.

Next, when the Vc becomes about 1600 V, the voltage across the terminals of the constant voltage diode 210 becomes the breakdown voltage of 1 kV. Therefore, even when the Vc is increased, the voltage across the constant voltage diode 210 is clamped to about 1 kV, so that the voltage divided by the resistance values of the resistor 209 and the photosensitive drum 1 is applied to the load (transfer roller) 113. This condition corresponds to the range indicated by d102 in FIG. 4. When the Vc is further increased, the voltage across the terminals of the constant voltage diode 207 becomes the breakdown voltage of about 1.6 kV at about 1800 V. When the Vc is increased to more than about 1800 V, current also flows in the loop indicated by arrows 220 and 221. Since the resistance of the constant voltage diode 207 is very small compared to the resistor 206, current flows toward the load (transfer roller) 113 through the constant voltage diode 207. This condition corresponds to the range indicated by d103 in FIG. 4. When the Vc is about 2600 V the current flowing to the load is canceled by the current loop through the resistor 206 and the current loop through the constant voltage diode 207, and voltage of output terminal 208 becomes 0 V. After that, the polarity becomes a positive, and the voltage rises. This condition corresponds to the range indicated by d104 in FIG. 4.

When the transfer positive bias is output, the output is adjusted such that the Vc is the predetermined voltage or more. In the present exemplary embodiment, the Vc equal to 2600 V or more, is applied to the constant voltage diode 207 as described above. The predetermined voltage can be adjusted by appropriately selecting the breakdown voltage of the constant voltage diode 207 according to the load that is the subject to which the voltage is to be output. Since the main current loop to the load (transfer roller) 113 connected to the terminal 208 becomes a loop from the constant voltage diode 207, therefrom to the terminal 208, therefrom to the load 113, and therefrom back to the constant voltage diode 207, as indicated by the arrows 220 and 221, the transfer positive bias is output. In this case, the voltage V0 applied to the load 113 is represented by an equation 1 described below.

$$V0 = Vc - Vz1 - Vz2 \quad \text{(Equation 1)}$$

Vz1: Breakdown voltage of constant voltage diode 207
Vz2: Breakdown voltage of constant voltage diode 210
Therefore, the voltage applied to the load 113 has a linear characteristic to the voltage Vc applied across the condenser 204 as indicated by d104 in FIG. 4.

On the other hand, when the transfer negative bias is applied, the output is adjusted to have the Vc of less than about 2600 V to apply the voltage not more than the breakdown voltage to the constant voltage diode 207, and the main current loop to the transfer roller 113 connected to the terminal 208 becomes a loop from the resistor 206 to the load 113, therefrom to the terminal 208, therefrom to the resistor 209, and therefrom back to the resistor 206. Therefore, the transfer negative bias is applied. The transfer negative bias might sometimes output a constant voltage regardless of the variation of the load. Therefore, there is no problem as long as the voltage of a fixed value or more is applied to the load, even if the Vc slightly varies as shown in d102 in FIG. 4. When the application level of the transfer negative bias is variably controlled, the range of d101 or d103 in FIG. 4 may be used.

As described above, the voltage applied to the constant voltage diode 207 is changed by adjusting the gate voltage of the transistor 201, and the direction of the main current loop to the transfer roller 113, serving as the load, can be changed with a threshold value defined by the breakdown voltage of the constant voltage diode 207. Thus, the polarity of the transfer bias can be changed. As illustrated in FIG. 4 (d104), the transfer positive bias can be controlled within the range having the linear characteristic, and the transfer negative bias can also be output.

As described above, according to the present exemplary embodiment, the polarity of the bias output to the load can be changed by changing the output level to the power supply circuit. As the result the circuit size can be reduced, and the control of the output voltage can be facilitated.

Figure 5:
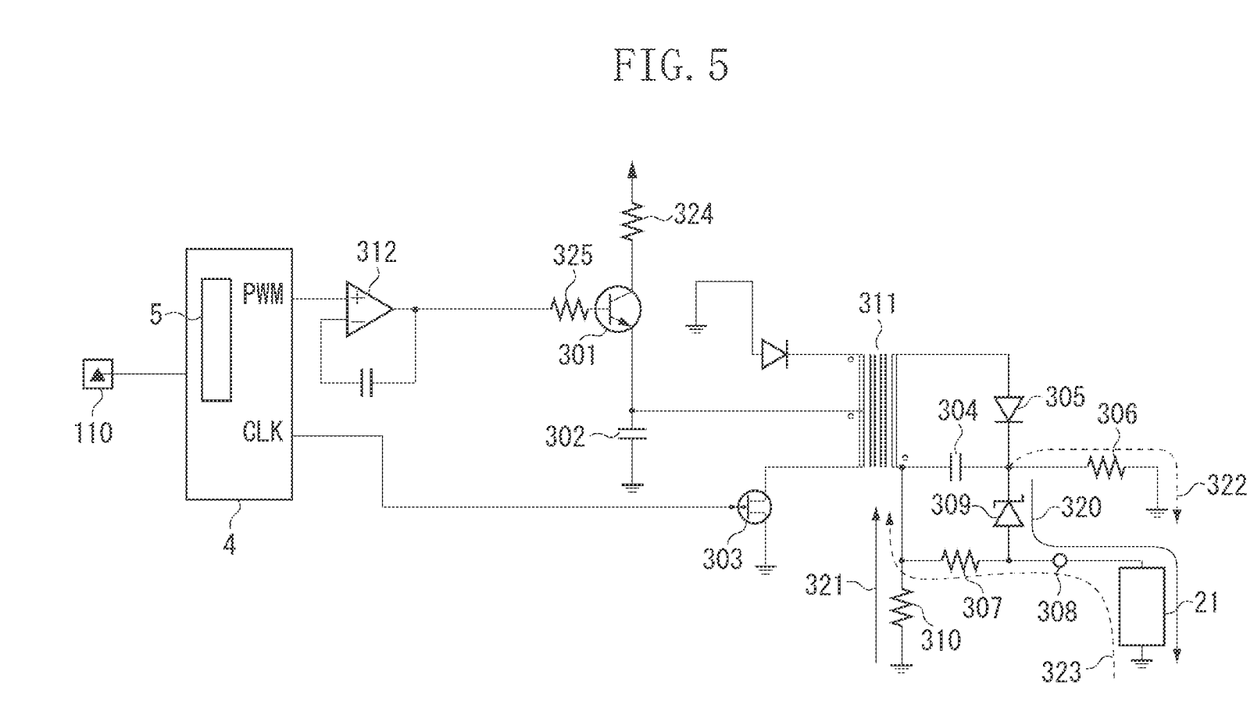
FIG. 5 is a diagram illustrating a voltage generation circuit according to a second exemplary embodiment.
Figure 6:
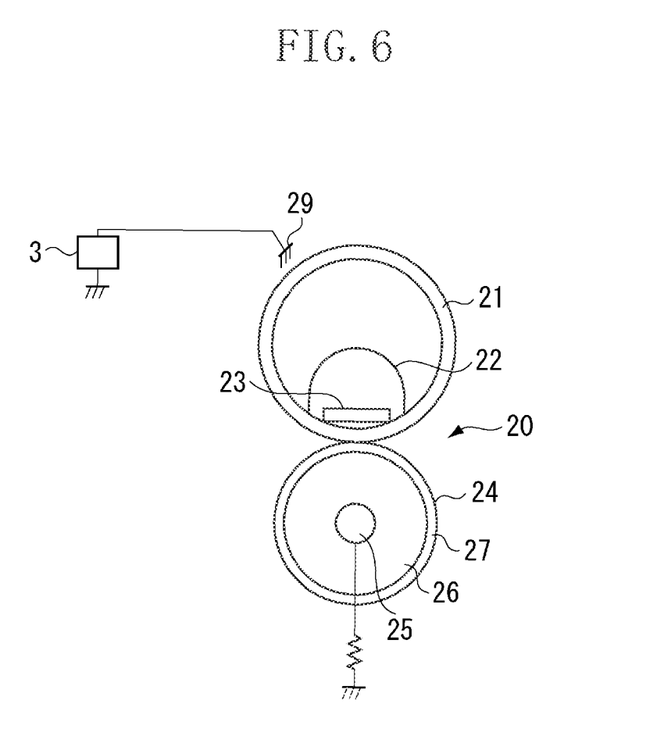
FIG. 6 is a diagram illustrating a configuration of a fixing apparatus.

Next, a high-voltage power supply according to a second exemplary embodiment will be described with reference to FIGS. 5 and 6. In the present exemplary embodiment, the voltage generation circuit and the target to which the voltage is applied are different from those in the first exemplary embodiment. The configuration other than the voltage generation circuit is the same as that in the first exemplary embodiment, therefore the description thereof will not be repeated.

A configuration of the fixing apparatus 20 in the present exemplary embodiment, which is the target to which voltage is applied, will be described in detail with reference to FIG. 6. The fixing apparatus 20 in the present exemplary embodiment includes the fixing film (fixing member) 21 and the pressure roller (pressure member) 24 that is in pressed contact with the fixing film 21. The pressure roller 24 is in pressed contact with the fixing film 21, and a fixing nip portion is formed. The fixing film 21 is a film having flexibility, and includes a heater 23 and a holder 22, illustrated in FIG. 6, provided on its inner peripheral surface. The holder 22 holds the heater 23, and has a function of guiding the rotation of the fixing film 21. The pressure roller 24 is constituted with an insulating tube 27 that forms an insulating layer, a conductive elastic roller 26, and a cored bar 25, wherein the cored bar 25 is grounded. Owing to the insulating tube 27 which is provided to the pressure roller 24 as described above, a predetermined potential difference is formed between the fixing film 21 and the pressure roller 24.

In the present exemplary embodiment, the bias having a polarity same as that of the toner (in the present exemplary embodiment, a bias having a negative polarity) is applied to the fixing film 21 from the high-voltage power supply 3 through a brush 29. The voltage applied to fix the developer image, which is non-fixed on the sheet P, is referred to as a fixing bias below. In the present exemplary embodiment, the toner charged to a negative polarity is used, but the toner charged to a positive polarity can also be used.

As described above in the present exemplary embodiment, when the developer image transferred onto the sheet P is fixed by the fixing apparatus, the fixing bias is applied to the fixing film 21, and at the fixing nip portion, force is exerted to the developer image acting from the fixing film 21 toward the pressure roller 24. More specifically, it is configured such that an electric field is generated in the direction in which the non-fixed developer image on the sheet P is pressed against the sheet P (in the direction from the fixing film 21 toward the pressure roller 24).

In the present exemplary embodiment, the configuration in which the insulating layer (insulating tube 27) is provided in the pressure roller 24 is described as one example. However, the insulating layer may be provided in at least one of the fixing film 21 and the pressure roller 24. For example, when the insulating layer is formed on the fixing film 21, the bias is applied to the fixing film. 21 with the polarity of the bias (positive polarity) opposite to that in the present exemplary embodiment.

The configuration of the voltage applying circuit according to the present exemplary embodiment will next be described with reference to FIG. 5. FIG. 5 illustrates the voltage generation circuit of the high-voltage power supply 3, serving as a bias applying unit, in the present exemplary embodiment. As described above, by applying the fixing bias, the electric field is generated in the direction in which the non-fixed developer image is pressed against the sheet P during the period when the sheet P passes through the fixing nip portion formed by the fixing film 21 and the pressure roller 24. Specifically, during the period when the sheet P passes through the fixing nip portion, based on the control signal from the CPU 5 in the printer control unit 4, a clock is input from the CPU 5 to an FET 303 to cause the FET 303 switching, and the transformer 311 is driven. When the transformer 311 is driven, the current at the secondary side is rectified by a rectifier diode 305, and voltage is generated across the terminals of a condenser 304. The fixing bias is applied from a terminal 308 to the brush 29, and the fixing bias is output to the fixing film 21. The voltage (hereinafter referred to as Vca) applied across the terminals of the condenser 304 is input to a base terminal of a transistor 301 through an integration circuit 312 and a resistor 325 in such a manner that an output voltage from a secondary side of an unillustrated transformer is fed back to the CPU 5, and the CPU 5 changes the PWM value in order that the fed-back voltage becomes the target voltage. The voltage of the condenser 3 is adjusted by the transistor 301. A collector terminal of the transistor 301 is connected to a power supply voltage through a resistor 324. As described above, the bias having a negative polarity is output as the fixing bias at least during the period when the sheet P passes through the fixing nip portion.

When a plurality of sheets P continuously pass through the fixing nip portion, as the number of the sheets P increases, the insulating tube 27 on the surface of the pressure roller 24 is gradually charged to the negative polarity due to the friction between the sheet P and the pressure roller 24, and under the influence by the fixing bias. When the surface potential of the pressure roller 24 becomes lower than the surface potential of the fixing film 21, the electric field, which is formed by the application of the fixing bias, is canceled, and further, the electric field exerted to the non-fixed toner in the direction from the pressure roller 24 to the fixing film 21 is generated. Therefore, the electric field in the direction in which the non-fixed developer image is attracted from the recording sheet P to the fixing film 21 (in the direction in which the non-fixed developer image is separated from the sheet P) is generated, and a so-called offset might be generated.

In view of this, in the present exemplary embodiment, the bias having a polarity (positive polarity) opposite to the polarity of the fixing bias (negative polarity in the present exemplary embodiment) is applied to the fixing film 21 during the period when the apparatus is driven and the sheet P does not pass through the fixing nip portion. When the bias having a negative polarity is applied, Vca is adjusted in order that the breakdown current flows through the constant voltage diode 309. Therefore, a main current loop (flow of current) to the load (fixing film) 21 connected to the terminal 308 becomes a loop from the resistor 306 to the load 21, therefrom to the terminal 308, therefrom to resistor 307, and back to the resistor 306, as indicated by arrows 322 and 323, and a fixing negative bias is applied. On the other hand, when a bias having a positive polarity is applied, the Vca is adjusted in order that voltage not more than the breakdown voltage is applied to the constant voltage diode 309. Therefore, the main current loop of the fixing film 21 connected to the terminal 308 becomes a loop from the constant voltage diode 309 to the terminal 308, therefrom to the fixing film 21, therefrom to the resistor 310, and therefrom back to the constant voltage diode 309, as indicated by arrows 320 and 321, and a fixing positive bias is applied.

In other words, the voltage applied to the constant voltage diode 309 is changed by adjusting the gate voltage of the transistor 301. Accordingly, the direction of the main current loop to the fixing film 21 is changed with the breakdown voltage of the constant voltage diode 309 defined as a threshold value, and the polarity of the fixing bias can be changed.

As described above, according to the present exemplary embodiment, the output level of the power supply circuit is changed, and the polarity of the bias output to the load can be changed. Consequently, the circuit configuration can be reduced, and the control of the output voltage can be facilitated.

According to the configuration described above, the range of the output voltage is decreased compared to the first exemplary embodiment. However, since the low price resistance is used instead of the constant voltage diode, the circuit can be configured with reduced cost.

Another exemplary embodiment will next be described.

The target to which the voltage is applied in the first exemplary embodiment may be the fixing apparatus described in the second exemplary embodiment. Further, the target to which the voltage is applied in the second exemplary embodiment may be the transfer roller serving as the transfer member described in the first exemplary embodiment.

In the above-mentioned first and second exemplary embodiments, it is assumed that the constant voltage generation circuit using the electromagnetic transformer is used as the constant voltage generation unit. However, the circuit generating the constant voltage is not limited to the electromagnetic transformer. For example, the circuit that changes the polarity of the output voltage described in the first and the second exemplary embodiments is applicable, even in a case of a circuit using a piezoelectric transformer or other constant voltage source.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-288822 filed Dec. 21, 2009, which is hereby incorporated by reference herein in its entirety.

What is claimed is:

1. A power supply comprising:
a transformer;
a switching unit configured to drive the transformer at a primary side of the transformer;
a voltage adjustment unit configured to adjust voltage of a capacitive element at a secondary side of the transformer; and
a first constant voltage member connected to a terminal of the capacitive element at a side of the transformer;
a second constant voltage member connected to a terminal different from the terminal of the capacitive element at the side of the transformer,
wherein the first constant voltage member is turned on and a voltage having a predetermined polarity is output through the capacitive element in a case where the voltage of the capacitive element is a first voltage, and the second constant voltage member is turned on and a voltage having a polarity opposite to the predetermined polarity is output through the capacitive element in a case where the voltage of the capacitive element is a second voltage higher than the first voltage.

2. The power supply according to claim 1, wherein a current path at the secondary side of the transformer when the first constant voltage member is on is different from a current path when the second constant voltage member is on.

3. The power supply according to claim 1, wherein the first and second constant voltage members are connected to a secondary winding of the transformer.

4. A power supply comprising:
a transformer;
a switching unit configured to drive the transformer at a primary side of the transformer;
a voltage adjustment unit configured to adjust voltage of a capacitive element at a secondary side of the transformer; and
a constant voltage member connected to a side outputting voltage to the capacitive element at the secondary side of the transformer, wherein
the constant voltage member is off and a voltage having a predetermined polarity is output through the capacitive element in a case where the voltage of the capacitive element is a first voltage, and the constant voltage member is turned on and a voltage having a polarity opposite to the predetermined polarity is output through the capacitive element in a case where the voltage of the capacitive element is a second voltage higher than the first voltage.

5. The power supply according to claim 4, wherein a current path at the secondary side of the transformer when the constant voltage member is off is different from a current path when the constant voltage member is on.

6. The power supply according to claim 4, wherein the constant voltage member is connected to a secondary winding of the transformer.

7. An image forming apparatus comprising:
an image forming unit configured to form an image on a recording medium; and
a power supply that outputs power to the image forming unit, wherein
the power supply includes:
a transformer;
a switching unit configured to drive the transformer at a primary side of the transformer;
a voltage adjustment unit configured to adjust voltage of a capacitive element at a secondary side of the transformer;
a first constant voltage member connected to a terminal of the capacitive element at a side of the transformer; and
a second constant voltage member connected to a terminal different from the terminal of the capacitive element at the side of the transformer, wherein
wherein the first constant voltage member is turned on and a voltage having a predetermined polarity is output through the capacitive element in a case where the voltage of the capacitive element is a first voltage, and the second constant voltage member is turned on and a voltage having a polarity opposite to the predetermined polarity is output through the capacitive element in a case where the voltage of the capacitive element is a second voltage higher than the first voltage.

8. The image forming apparatus according to claim 7, wherein a current path at the secondary side of the transformer when the first constant voltage member is on is different from a current path when the second constant voltage member is on.

9. The image forming apparatus according to claim 7, wherein the image forming unit includes a transfer member that transfers an image onto the recording medium or a fixing unit that fixes the image formed on the recording medium.

10. The image forming apparatus according to claim 7, wherein the first and second constant voltage members are connected to a secondary winding of the transformer.

11. An image forming apparatus comprising:
an image forming unit configured to form an image on a recording medium; and
a power supply that outputs power to the image forming unit, wherein
the power supply includes:
a transformer;
a switching unit configured to drive the transformer at a primary side of the transformer;
a voltage adjustment unit configured to adjust voltage of a capacitive element at a secondary side of the transformer; and
a constant voltage member connected to a side outputting voltage to the capacitive element at the secondary side of the transformer, wherein
the constant voltage member is off and a voltage having a predetermined polarity is output through the capacitive element in a case where the voltage of the capacitive element is a first voltage, and the constant voltage member is turned on and a voltage having a polarity opposite to the predetermined polarity is output through the capacitive element in a case where the voltage of the capacitive element is a second voltage higher than the first voltage.

12. The image forming apparatus according to claim 11, wherein a current path at the secondary side of the transformer when the constant voltage member is off is different from a current path when the constant voltage member is on.

13. The image forming apparatus according to claim 11, wherein the image forming unit includes a fixing unit that fixes the image formed on the recording medium.

14. The image forming apparatus according to claim 11, wherein the constant voltage member is connected to a secondary winding of the transformer.

* * * * *